(12) United States Patent
Nordbruch

(10) Patent No.: US 10,391,876 B2
(45) Date of Patent: Aug. 27, 2019

(54) CHARGING STATION AND ELECTRIC VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 15/552,427

(22) PCT Filed: Jan. 29, 2016

(86) PCT No.: PCT/EP2016/051860
§ 371 (c)(1),
(2) Date: Aug. 21, 2017

(87) PCT Pub. No.: WO2016/142101
PCT Pub. Date: Sep. 15, 2016

(65) Prior Publication Data
US 2018/0029489 A1      Feb. 1, 2018

(30) Foreign Application Priority Data

Mar. 11, 2015 (DE) .................... 10 2015 204 362

(51) Int. Cl.
*B60L 9/00* (2019.01)
*B60L 11/00* (2006.01)
(Continued)

(52) U.S. Cl.
CPC .......... *B60L 11/1838* (2013.01); *B60L 53/18* (2019.02); *B60L 53/30* (2019.02); *B60L 53/60* (2019.02);
(Continued)

(58) Field of Classification Search
CPC ............... B60L 11/1816; B60L 11/182; B60L 11/1824; B60L 11/1838; B60L 11/1846;
(Continued)

(56) References Cited

U.S. PATENT DOCUMENTS 10,203,949 B2 * 2/2019 Choi ..................... G06F 8/65
2008/0147265 A1   6/2008 Breed
(Continued)

FOREIGN PATENT DOCUMENTS

DE    102006056220 A1   6/2008
DE    202010014316 U1   3/2012
(Continued)

OTHER PUBLICATIONS

International Search Report dated Apr. 15, 2016, of the corresponding International Application PCT/EP2016/051860 filed Jan. 29, 2016.

*Primary Examiner* — Harry Y Oh
(74) *Attorney, Agent, or Firm* — Norton Rose Fulbright US LLP; Gerard Messina

(57) ABSTRACT

A method for operating a charging station, including establishing a communication link between the charging station and an electric vehicle; checking, via the communication link, whether a software stored on a processing unit of the electric vehicle has to be updated; and transmitting, as a function of the check, update data for updating the software via the communication link to the electric vehicle with the aid of the charging station so that the software may be updated based on the update data. A charging station, an electric vehicle, a method for operating an electric vehicle, and a computer program, are also described.

7 Claims, 2 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2019.01) | |
| *B60L 11/18* | (2006.01) | |
| *G07F 15/00* | (2006.01) | |
| *G06F 8/65* | (2018.01) | |
| *G07C 5/00* | (2006.01) | |
| *H04L 29/08* | (2006.01) | |
| *B60L 53/30* | (2019.01) | |
| *B60L 53/60* | (2019.01) | |
| *B60L 53/65* | (2019.01) | |
| *B60L 53/18* | (2019.01) | |
| *B60L 53/68* | (2019.01) | |
| *B60L 53/14* | (2019.01) | |
| *B60L 53/12* | (2019.01) | |

(52) U.S. Cl.
CPC ............ *B60L 53/65* (2019.02); *B60L 53/68* (2019.02); *G06F 8/65* (2013.01); *G07C 5/008* (2013.01); *G07F 15/003* (2013.01); *G07F 15/005* (2013.01); *H04L 67/141* (2013.01); *H04L 67/34* (2013.01); *B60L 53/12* (2019.02); *B60L 53/14* (2019.02); *B60L 2240/70* (2013.01); *B60Y 2200/91* (2013.01); *B60Y 2400/112* (2013.01); *B60Y 2400/114* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ............ B60L 2230/12; B60L 2230/40; B60L 2240/70; G06F 8/65; Y02T 10/7088; Y02T 90/14; Y02T 90/16; Y02T 90/163
See application file for complete search history.

(56) References Cited

U.S. PATENT DOCUMENTS

| | | | |
|---|---|---|---|
| 2011/0046842 A1 | 2/2011 | Smith | |
| 2011/0251753 A1 | 10/2011 | Saito | |
| 2012/0112694 A1* | 5/2012 | Frisch | B60L 11/1824 320/109 |
| 2012/0166240 A1 | 6/2012 | Jones et al. | |
| 2013/0181674 A1* | 7/2013 | Tremblay | B60L 11/1818 320/109 |
| 2014/0096126 A1* | 4/2014 | Gourlay | G05B 15/02 717/173 |
| 2014/0152254 A1 | 6/2014 | Juhasz | |
| 2014/0285146 A1* | 9/2014 | Huston | B60L 11/1816 320/109 |
| 2015/0113520 A1* | 4/2015 | Kotani | G06F 8/654 717/172 |
| 2015/0178067 A1* | 6/2015 | Ji | G01C 21/36 717/170 |
| 2015/0278038 A1* | 10/2015 | Halker | G06F 11/20 714/3 |
| 2015/0339114 A1* | 11/2015 | Rockwell | G06F 8/65 701/1 |
| 2015/0347121 A1* | 12/2015 | Harumoto | G01C 21/32 717/172 |
| 2016/0013934 A1* | 1/2016 | Smereka | G06F 21/572 713/171 |
| 2016/0255185 A1* | 9/2016 | Elzein | G06F 8/65 455/557 |
| 2017/0262277 A1* | 9/2017 | Endo | G06F 8/658 |
| 2018/0063285 A1* | 3/2018 | Nordbruch | H04L 41/082 |
| 2018/0074811 A1* | 3/2018 | Kiyama | G06F 8/65 |
| 2018/0097804 A1* | 4/2018 | Boehm | H04W 12/06 |
| 2018/0167380 A1* | 6/2018 | Debickes | G06F 21/57 |

FOREIGN PATENT DOCUMENTS

| | | |
|---|---|---|
| DE | 102012110913 A1 | 5/2014 |
| DE | 102013021099 A1 | 6/2015 |
| WO | 9928159 A1 | 6/1999 |

\* cited by examiner

CHARGING STATION AND ELECTRIC VEHICLE

FIELD

The present invention relates to a method for operating a charging station and to a charging station. The present invention furthermore relates to an electric vehicle and to a method for operating an electric vehicle. The present invention furthermore relates to a computer program.

BACKGROUND INFORMATION

Electric vehicles in general require a charging infrastructure for their operation, which may include, for example, one or multiple charging stations to charge an electrical energy store of the electric vehicle.

Vehicle inspections including a detailed defect analysis and an elimination through software updates are generally carried out at regular intervals, for example at two-year intervals and/or at intervals of 20,000 kilometers, in repair shops. The analysis is carried out by a cable connection via an on-board diagnosis (OBD) plug, via which larger amounts of data may be transferred.

In the case of greater problems, recalls for the vehicle, in particular for the electric vehicles are usually launched by the manufacturers outside of the inspections.

Software updates are increasingly imported via a mobile communication link to the vehicle, for example to the electric vehicle, for elimination in the case of smaller and/or non-critical defects known to the manufacturers and/or original equipment manufacturers (OEMs). Such mobile communication links to the vehicle may be subject to breakdowns in the communication when a coverage of the mobile communication network has dead zones or, for example, when the vehicle enters an underground parking garage. An update of a software on the vehicle may thus fail.

SUMMARY

It is an object of the present invention to provide an efficient use of a charging station and/or which makes it possible for software stored on a processing unit of an electric vehicle to be reliably updated.

This object may be achieved in accordance with the present invention. Advantageous embodiments of the present invention are described herein.

According to one aspect, a method for operating a charging station is provided, including the following steps:
 establishing a communication link between the charging station and an electric vehicle;
 checking, via the communication link, whether a software stored on a processing unit of the electric vehicle has to be updated; and
 transmitting, as a function of the check, update data for updating the software via the communication link to the electric vehicle with the aid of the charging station so that the software may be updated based on the update data.

According to one further aspect, a charging station is provided which is designed to charge an electrical energy store of an electric vehicle, the charging station furthermore including:
 a communication interface for establishing a communication link between the charging station and an electric vehicle,
 so that it is possible to check, via the communication link, whether a software stored on a processing unit of the electric vehicle has to be updated,
 the communication interface being designed to transmit, as a function of the check, update data for updating the software via the communication link to the electric vehicle so that the software may be updated based on the update data.

According to still another aspect, an electric vehicle is provided, including:
 a processing unit on which software is stored;
 a communication interface for establishing a communication link between the electric vehicle and a charging station,
 so that it is possible to check, via the communication link, whether the software stored on the processing unit of the electric vehicle has to be updated,
 the communication interface being designed to receive, as a function of the check, update data for updating the software via the communication link from the charging station so that the software may be updated based on the update data.

According to one further aspect, a method for operating an electric vehicle is provided, including the following steps:
 establishing a communication link between the electric vehicle and a charging station,
 checking, via the communication link, whether a software stored on a processing unit of the electric vehicle has to be updated; and
 receiving with the aid of the electric vehicle, as a function of the check, update data for updating the software transmitted via the communication link from the charging station to the electric vehicle so that the software may be updated based on the update data.

According to a further aspect, a computer program is provided, which includes program code for carrying out the method for operating a charging station and/or the method for operating an electric vehicle if the computer program is executed on a computer.

The present invention thus in particular and among other things includes using a charging station to establish a communication link to the electric vehicle (e-vehicle). In this way, it is possible to advantageously check whether a software stored on a processing unit of the e-vehicle has to be updated. According to the present invention, it is furthermore provided that update data are transmitted to the electric vehicle via this communication link when the check has yielded that the software has to be updated. The charging station may thus be used to import update data, in addition to electrically charging the energy store. The charging station thus has a dual function: electrical charging and enabling an update of the software. In this way, an efficient use of the charging station is created.

Furthermore, it is in general technically less complex to create a reliable and robust communication link between the charging station and the e-vehicle compared to conventional mobile communication networks, which are to cover a major city, for example. Usually, an e-vehicle will drive to the charging station to charge its electrical energy store. This means that the e-vehicle is then situated in spatial proximity to the charging station, which facilitates establishing a communication link to the e-vehicle.

The charging station thus represents a communication infrastructure, which advantageously establishes a robust and reliable communication link between the charging station and the e-vehicle. Even if the charging station is situated in an underground parking garage, a software update may still be carried out, even though conventional mobile communication networks may not be present in an underground parking garage. In this respect, a safer and more reliable transmission of the update data to the e-vehicle is thus advantageously made possible. In this way, an update of the software may advantageously be carried out more safely and more robustly.

Software includes, for example, a program or a number of programs which are used to operate a computer, in particular the processing unit.

Software includes, for example, one or multiple programs and an associated documentation.

Software includes, for example, one or multiple programs and, for example, an associated documentation and, for example, further data (programs and/or documentation and/or data) which are necessary to operate a computer.

According to one specific embodiment, the charging station includes a processor. The processor is designed, for example, to carry out the check.

In one specific embodiment, the check is carried out with the aid of the charging station, in particular with the aid of the processor. In this way, it may be efficiently checked whether or not an update has to be carried out.

According to one specific embodiment, it is provided that an electrical energy store of the electric vehicle is charged with the aid of the charging station during at least one of the steps of establishing, checking and transmitting (in particular during all steps). This in particular yields the technical effect that the electrical energy store may be efficiently charged. In particular, a saving of time may thus be achieved compared to the situation in which the energy store is charged first and then the check takes place, or vice versa.

According to one specific embodiment, it is provided that an electrical energy store of the electric vehicle is charged with the aid of the charging station even before the step of establishing. In this way, the electrical energy store may advantageously be charged quickly and efficiently.

Preferably, it is provided that the charging station charges the energy store first, the communication link not being established and the check not taking place until the charging has ended. In this way, a charging may advantageously be safely completed, a charging process advantageously no longer being able to result in interferences during the establishment of the communication.

Preferably, it is alternatively provided that the charging station already charges the energy store when the establishment of the communication link is initiated. In this way, the electrical energy store may advantageously be charged quickly and efficiently.

The charging of the energy store in particular includes that the energy store is charged completely or partially.

A charging station within the meaning of the present invention thus in particular provides a charging option for an electrical energy store of an electric vehicle. This means, in particular, that the charging station assumes the functionality of an electrical charging station. The charging station may, for example, be designed as a wireless charging station. An inductive charging of the electrical energy store is thus advantageously enabled via a wireless charging station. The charging station may, for example, be designed as a wired charging station. An electrical charging of the electrical energy store of the electric vehicle is thus advantageously enabled via a wired charging station with the aid of a power cable. Within the meaning of the present invention, a power cable may also be referred to as a charging cable. The charging cable is preferably integrated into a cable conduit.

According to one specific embodiment, the charging station may be designed both as a wireless and also as a wired charging station. This means that both inductive charging and wired charging are enabled with the aid of the charging station.

An electric vehicle within the meaning of the present invention is, in particular, a vehicle which is driven with the aid of electrical energy. The electric vehicle is an electric motor vehicle, for example. In particular, the electric vehicle is an electric road vehicle. The electric vehicle is referred to as an electric car, for example, and also as an electric automobile. An electric vehicle within the meaning of the present invention includes, for example, an electric motor, or generally speaking an electric drive.

According to one specific embodiment, the electric vehicle includes an electrical energy store. An electrical energy store may, for example, provide electrical energy for an electric drive of the electric vehicle.

An electrical energy store within the meaning of the present invention includes, for example, one or multiple batteries or one or multiple rechargeable batteries. For example, an energy store within the meaning of the present invention includes one or multiple capacitors and/or one or multiple superconducting coils.

According to one specific embodiment, it is provided that a further communication link is established between the charging station and a server via a communication network, the charging station receiving the update data from the server via the further communication link in order to transmit the update data via the communication link to the e-vehicle. This in particular yields the technical advantage that the charging station itself does not have to have the update data stored. These are located on the server, or the server is able to access these update data.

As a result, the charging station itself may be operated efficiently and with a reduced need for storage.

According to one specific embodiment, the server is a server of an OEM, i.e., an original equipment manufacturer. In particular, the server is a server of an OEM inspection provider. Such a provider carries out an inspection of the e-vehicle, i.e., in particular of vehicle systems of the e-vehicle, for example online, i.e., via the communication links.

According to one specific embodiment, it is provided that a further communication link is established between the charging station and a server.

According to one specific embodiment, it is provided that a further communication link is established between the charging station and a server, the check being carried out with the aid of the server.

The server may thus access the e-vehicle remotely, in particular via the further communication link and via the communication link, for example to carry out a defect analysis of the processing unit and/or, for example, to install update data.

According to one specific embodiment, it is provided that the charging station itself provides the update data. This means that the update data are stored on the charging station, or that a database is provided, which the charging station may access, the update data being stored in the database.

According to one specific embodiment, it is provided that the check includes whether the processing unit has a malfunction and/or whether the processing unit had a malfunction and, if so, whether an update of the software suffices to eliminate the malfunction. This in particular yields the technical advantage that a malfunction may be efficiently identified. This in particular may yield the technical advantage that it is possible to efficiently identify whether the update of the software suffices to eliminate the malfunction. Such an identification may advantageously allow a safe operation of the e-vehicle.

In one specific embodiment, it is provided that, when the update of the software is not sufficient to eliminate the malfunction, at least one of the following actions is carried out with the aid of the charging station:

transmitting a message to a keeper and/or to a driver of the electric vehicle to inform them/him, her about this;
transmitting a message to a repair shop of a keeper and/or of a driver of the electric vehicle to inform it about this;
transmitting a message to an operator of a vehicle fleet when the electric vehicle is part of the vehicle fleet (for example, the electric vehicle may be a rental vehicle);
blocking and/or limiting at least one driving function of the electric vehicle concerning the malfunction;
transmitting a message to a breakdown service to commission it with a repair of the malfunction; and
transmitting a message to a pick-up service to commission it with a pick-up of the electric vehicle.

The transmission may be carried out via a communication network, for example.

Transmitting the message to the keeper and/or to the driver of the e-vehicle to inform them/him, her about this, in particular, yields the technical advantage that they may gain knowledge that the update of the software is not sufficient to eliminate the malfunction.

Transmitting the message to the repair shop to inform it about this, in particular, yields the technical advantage that the repair shop gains knowledge that the update of the software is not sufficient to eliminate the malfunction. Accordingly, the repair shop may then advantageously take preparatory measures to eliminate the malfunction when the e-vehicle is on-site in the repair shop.

Blocking and/or limiting the driving function of the e-vehicle relevant to the malfunction, in particular, yields the technical advantage that a safe operation of the e-vehicle may thus be enabled. In this way, it may advantageously be avoided that the malfunction occurs again or, should this occur, that the effect is less critical due to the limitation.

Transmitting the message to the breakdown service, in particular, yields the technical advantage that it is able to repair the malfunction while still on-site, i.e., for example, when the e-vehicle is situated at the charging station. In this way, for example, a driver of the e-vehicle does not have to drive to the repair shop again for a repair.

Transmitting the message to a pick-up service, in particular, yields the technical advantage that the driver does not have to take care of this himself or herself. Thus, he or she saves time.

In one other specific embodiment, it is provided that, when the update of the software suffices, a message is transmitted to a keeper and/or to a driver of the e-vehicle with the aid of the charging station to inform them/him, her of this and/or to request from them/him, her a confirmation for carrying out the update or for commissioning the breakdown service or the pick-up service. This yields the technical advantage in particular that the keeper and/or the driver must explicitly confirm when the software is to be updated or when the breakdown service or the pick-up service is to be accordingly commissioned. In particular, it is then provided that the software is updated, or the breakdown service or the pick-up service is commissioned, only in response to a confirmation on the part of the keeper and/or on the part of the driver.

According to one specific embodiment, it is provided that the charging station is designed or configured to implement or carry out the method for operating a charging station.

According to one specific embodiment, it is provided that the electric vehicle is designed or configured to implement or carry out the method for operating an electric vehicle.

According to one specific embodiment, it is provided that a communication via the communication network is and/or is being encrypted.

According to one specific embodiment, the communication network includes a mobile communication network and/or a WLAN communication network. In particular, a WLAN communication network may advantageously provide a particularly robust, stable and broadband communication link.

According to one specific embodiment, the communication link between the charging station and the e-vehicle is encrypted.

According to one specific embodiment, it is provided that the communication link includes a wireless communication link.

In one specific embodiment, it is provided that the communication link includes a wired communication link.

In one specific embodiment, it is provided that the wired communication link is being formed or is formed with the aid of a patch cable.

In one specific embodiment, it is provided that the patch cable is integrated into a cable conduit including a charging cable for charging an electrical energy store of the e-vehicle.

According to one specific embodiment, it is provided that the patch cable is formed separately from a cable conduit including a charging cable for charging an electrical energy store of the e-vehicle. Separately here means that the patch cable is formed outside the cable conduit.

In one specific embodiment, it is provided that two patch cables are provided, one patch cable being integrated into a cable conduit including a charging cable for charging an electrical energy store of the e-vehicle, and another patch cable being formed separately from the cable conduit. Separately here means that the patch cable is formed outside the cable conduit.

According to one specific embodiment, the charging station includes a cable conduit including a charging cable for charging an electrical energy store of the e-vehicle.

According to this specific embodiment, the charging station includes one or multiple access points (wireless access point, base station). This means that, for example, the charging station includes one or multiple WLAN base stations and/or one or multiple mobile communication base stations, for example long term evolution (LTE) base stations. In this way, a wireless communication link is thus enabled between the e-vehicle and the charging station.

In one specific embodiment, it is provided that the communication interface is designed to establish a further communication link between the charging station and a server via a communication network, so that the charging station is able to receive the update data from the server via the further communication link in order to transmit the update data via the communication link to the e-vehicle.

According to one specific embodiment, it is provided that the communication interface is designed for a wireless and/or wired communication link, for the wired communication link the communication interface including a patch cable for forming the wired communication link between the charging station and the electric vehicle, the patch cable being integrated into a cable conduit including a charging cable for charging the electrical energy store, or being formed separately from a cable conduit including a charging cable for charging the electrical energy store.

Separately here means that the patch cable is formed outside the cable conduit.

Device features are derived analogously from corresponding method features, and vice versa. This means that technical functionalities related to the method are derived from corresponding functionalities related to the device, and vice versa.

This means in particular that it is provided, according to one specific embodiment, that a processor of the charging station is designed to carry out the technical method steps according to the method in such a way that it appropriately controls the communication interface.

According to one specific embodiment, it is thus provided that the processor is designed to ascertain or generate the above-mentioned messages, the communication interface then, in particular, being designed to transmit these messages, or one of the messages, via the communication network, for example, to the breakdown service and/or, for example, to the pick-up service and/or, for example, to the repair shop and/or, for example, to the keeper and/or to the driver.

Accordingly, it is then provided according to one specific embodiment that the communication interface of the charging station is accordingly designed to receive a confirmation.

According to one further specific embodiment, it is provided that the software is updated based on the update data.

The present invention is described in greater detail below based on preferred exemplary embodiments.

DETAILED DESCRIPTION OF EXAMPLE EMBODIMENTS

Figure 1:
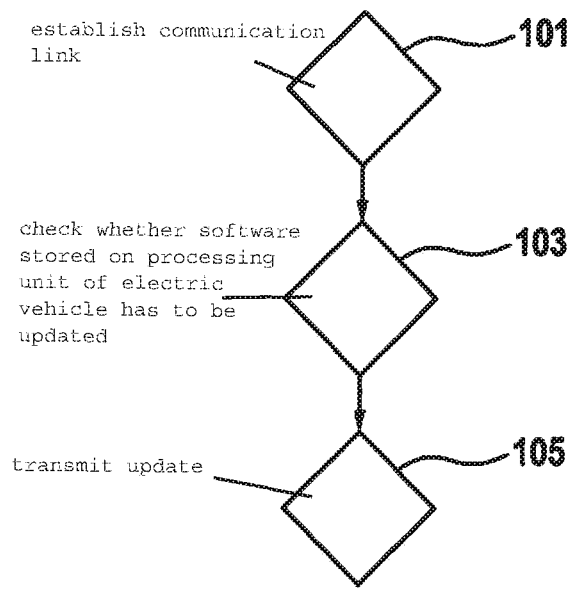
FIG. 1 shows a flow chart of a method for operating a charging station.

FIG. 1 shows a flow chart of a method for operating a charging station.

The method includes the following steps:
establishing 101 a communication link between the charging station and an electric vehicle;
checking 103, via the communication link, whether a software stored on a processing unit of the electric vehicle has to be updated; and
transmitting 105, as a function of the check, update data for updating the software via the communication link to the electric vehicle with the aid of the charging station so that the software may be updated based on the update data.

According to one specific embodiment, it is provided that the check is carried out with the aid of the charging station.

Figure 2:
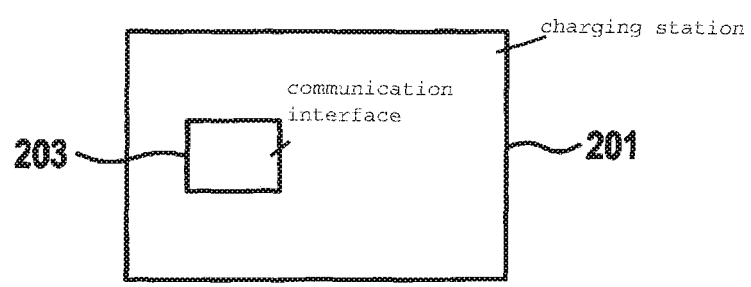
FIG. 2 shows a charging station.

FIG. 2 shows a charging station 201.

Charging station 201 is designed to charge an electrical energy store of an electric vehicle.

Charging station 201 furthermore includes:
a communication interface 203 for establishing a communication link between the charging station and an electric vehicle
so that it is possible to check, via the communication link, whether a software stored on a processing unit of the electric vehicle has to be updated,
the communication interface being designed to transmit, as a function of the check, update data for updating the software via the communication link to the electric vehicle so that the software may be updated based on the update data.

According to one specific embodiment, charging station 201 includes a processor, which is designed, for example, to carry out the check.

Figure 3:
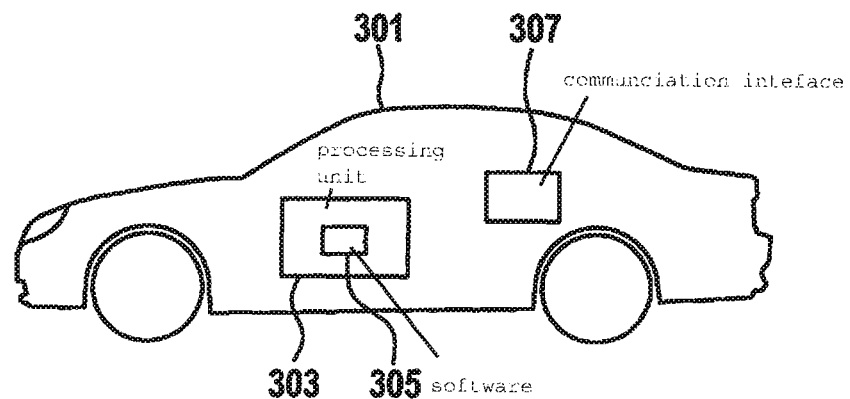
FIG. 3 shows an electric vehicle.

FIG. 3 shows an electric vehicle 301.

Electric vehicle 301 includes:
a processing unit 303 on which software 305 is stored;
a communication interface 307 for establishing a communication link between the electric vehicle and a charging station,
so that it is possible to check, via the communication link, whether the software 305 stored on the processing unit of the electric vehicle has to be updated,
the communication interface 307 being designed to receive, as a function of the check, update data for updating the software 305 via the communication link from the charging station so that the software may be updated based on the update data.

Figure 4:
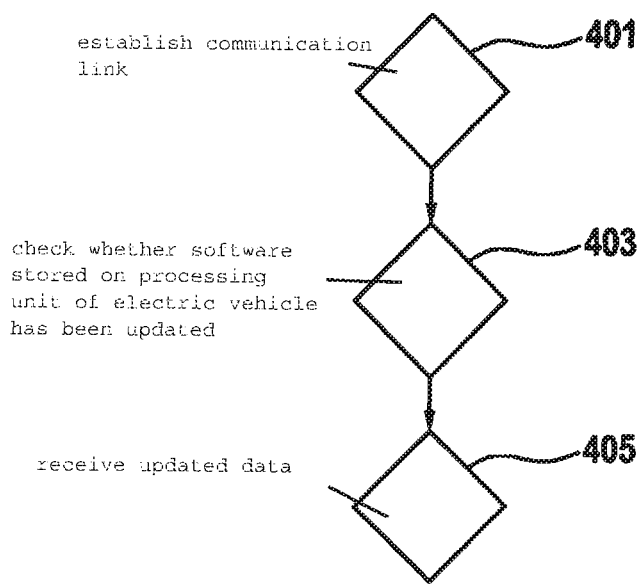
FIG. 4 shows a flow chart of a method for operating an electric vehicle.

FIG. 4 shows a flow chart of a method for operating an electric vehicle. The electric vehicle may, for example, be electric vehicle 301 from FIG. 3.

The method includes the following steps:
establishing 401 a communication link between the electric vehicle and a charging station;
checking 403, via the communication link, whether a software stored on a processing unit of the electric vehicle has to be updated; and
receiving 405 with the aid of the electric vehicle, as a function of the check 403, update data for updating the software transmitted via the communication link from the charging station to the electric vehicle so that the software may be updated based on the update data.

According to one further specific embodiment, it is provided that the software is updated based on the update data.

The present invention thus in particular and among other things includes the idea of providing a technical and efficient concept which enables a regular inspection analysis, including a possibly necessary import of software updates (software actualizations) in electric vehicles. The regularity may, in particular, mean up to several times a day. This takes place in particular every time the e-vehicle is connected to the charging station to charge the electrical energy store.

The analysis and the installation of possibly necessary software updates are, in particular, provided via a WLAN communication link, which advantageously is a robust, stable and broadband communication link.

According to one specific embodiment, the check and the transmission of the update data, if necessary, take place during charging.

According to one specific embodiment, the charging station assumes the functionality of an OEM inspection provider. This means that, according to this specific embodiment, the charging station carries out both the check and the transmission of update data. According to another specific embodiment, the charging station is connected to an OEM inspection provider, this OEM inspection provider carrying out the check and transmitting the update data to the charging station, so that it is then able to forward the received update data to the e-vehicle.

According to one specific embodiment, the charging station is connected to all and/or different and/or multiple OEMs.

In this way it is in particular ensured that the latest inspection analyses and software updates, i.e., software actualizations, are always available.

If defects and/or necessary software updates are detected during an analysis, it is preferably provided that the update data are transmitted to the e-vehicle. This means that the software updates are preferably installed.

In the case in which the software updates are not sufficient to eliminate the discovered defects, at least one or multiple of the following actions is/are triggered or carried out:

informing the keeper/driver (immediately or when picking up the vehicle) about the defect (for example, a message is transmitted to a mobile terminal of the keeper/of the driver);

transmitting a message to a vehicle fleet operator when the electric vehicle is part of a vehicle fleet;

informing the "standard" repair shop, generally speaking the repair shop, of the keeper/driver (the information also including the information about the defect) so that it is able to schedule an appointment with the driver/the keeper and procure possibly necessary materials;

if necessary, "blocking" and/or limiting the e-vehicle with respect to the driving properties when a serious defect is present;

commissioning an immediate service on-site (preferably upon coordination with the keeper); and commissioning a pick-up service (for example, to transfer the e-vehicle to a repair shop).

If the software updates suffice, according to one specific embodiment at least the keeper/driver is informed. According to one specific embodiment, a permission/request for this service is obtained from the driver/keeper in advance (i.e., prior to an update, in particular prior to a transmission of the update data).

Within the meaning of the present invention, update and actualization may generally be used synonymously.

What is claimed is:

1. A method of operating a charging unit, comprising:
    charging, by the charging station, an electrical energy store of the electric vehicle;
    establishing, by the charging station, a communication link between the charging station and an electric vehicle;
    establishing, by the charging station, a further communication link between the charging station and a server via a communication network;
    performing, by the server via the communication link and the further communication link, a defect analysis of a processing unit of the electric vehicle;
    determining by the server, based on the defect analysis, the processing unit of the electric vehicle has a defect;
    determining, by the server, whether a software update is sufficient to eliminate the defect of the processing unit of the electric vehicle;
    determining, by the server, the software update is not sufficient to eliminate the defect of the processing unit of the electric vehicle;
    based on determining the software update is not sufficient to eliminate the defect, at least one of the following actions is carried out with the aid of the charging station:
        transmitting a message to an operator of a vehicle fleet when the electric vehicle is part of a vehicle fleet;
        transmitting a message to a repair shop of a keeper and/or driver of the electric vehicle to inform the repair shop that the software update is not sufficient to eliminate the defect;
        blocking and/or limiting at least one driving function of the electric vehicle relevant to the defect;
        transmitting a message to a breakdown service to commission the breakdown service with a repair of the malfunction; and
        transmitting a message to a pick-up service to commission the pick-up service with a pick-up of the electric vehicle.

2. The method as recited in claim 1, wherein the electrical energy store of the electric vehicle is charged with the aid of the charging station before the step of establishing.

3. The method as recited in claim 1, wherein the communication link is at least one of a wireless communication link and a wired communication link, the wired communication link being formed with the aid of a patch cable which is integrated into a cable conduit including a charging cable for charging an electrical energy store of the electric vehicle, or being formed separately from a cable conduit including a charging cable for charging an electrical energy store of the electric vehicle.

4. A method of operating a charging unit, comprising:
    charging, by the charging station, an electrical energy store of the electric vehicle;
    establishing, by the charging station, a communication link between the charging station and an electric vehicle;
    establishing, by the charging station, a further communication link between the charging station and a server via a communication network;
    performing, by the server via the communication link and the further communication link, a defect analysis of a processing unit of the electric vehicle;
    determining, by the server, based on the defect analysis, the processing unit of the electric vehicle has a defect;
    determining, by the server, whether a software update is sufficient to eliminate the defect of the processing unit of the electric vehicle;
    determining, by the server, the software update is sufficient to eliminate the defect of the processing unit of the electric vehicle;
    based on determining the software update is sufficient to eliminate the detect of the processing unit of the electric vehicle, transmitting a message to a keeper and/or driver of the electric vehicle, with the aid of the charging station, to request from the keeper and/or driver a confirmation for carrying out an update;
    after receiving the confirmation from the keeper and/or driver, transmitting by the server to the electric vehicle via the further communication link and the communication link, the software update for installing on the processing unit of the electric vehicle.

5. A method of operating a charging unit, comprising:
    charging, by the charging station, an electrical energy store of the electric vehicle;
    establishing, by the charging station, a communication link between the charging station and an electric vehicle;
    establishing, by the charging station, a further communication link between the charging station and a server via a communication network;
    performing, by the server via the communication link and the further communication link, a defect analysis of a processing unit of the electric vehicle;

determining by the server, based on the defect analysis, the processing unit of the electric vehicle has a defect;

determining, by the server, whether a software update is sufficient to eliminate the defect of the processing unit of the electric vehicle;

determining, by the server, the software update is not sufficient to eliminate the defect of the processing unit of the electric vehicle; and based on determining the software update is not sufficient to eliminate the defect, a blocking and/or limiting of at least one driving function of the electric vehicle relevant to the defect is carried out with the aid of the charging station.

6. A method of operating a charging unit, comprising:

charging, by the charging station, an electrical energy store of the electric vehicle;

establishing, by the charging station, a communication link between the charging station and an electric vehicle;

establishing, by the charging station, a further communication link between the charging station and a server via a communication network;

performing, by the server via the communication link and the further communication link, a defect analysis of a processing unit of the electric vehicle;

determining by the server, based on the defect analysis, the processing unit of the electric vehicle has a defect;

determining, by the server, whether a software update is sufficient to eliminate the defect of the processing unit of the electric vehicle;

determining, by the server, the software update is not sufficient to eliminate the defect of the processing unit of the electric vehicle; and based on determining the software update is not sufficient to eliminate the defect, a transmitting of a message to the breakdown service to commission a breakdown service with the repair of the malfunction is carried out with the aid of the charging station.

7. A method of operating a charging unit, comprising:

charging, by the charging station, an electrical energy store of the electric vehicle;

establishing, by the charging station, a communication link between the charging station and an electric vehicle;

establishing, by the charging station, a further communication link between the charging station and a server via a communication network;

performing, by the server via the communication link and the further communication link, a defect analysis of a processing unit of the electric vehicle;

determining by the server, based on the defect analysis, the processing unit of the electric vehicle has a defect;

determining, by the server, whether a software update is sufficient to eliminate the defect of the processing unit of the electric vehicle;

determining, by the server, the software update is not sufficient to eliminate the defect of the processing unit of the electric vehicle; and based on determining the software update is not sufficient to eliminate the defect, a transmitting of a message to a pick-up service to commission the pick-up service to pick-up the electric vehicle, is carried out with the aid of the charging station.

* * * * *